United States Patent
Woolven et al.

(10) Patent No.: US 12,380,239 B1
(45) Date of Patent: Aug. 5, 2025

(54) SYSTEMS AND METHODS FOR PROVIDING SECURE MULTI-TIERED ACCESS TO CASE DATASETS

(71) Applicant: Veeva Systems Inc., Pleasanton, CA (US)

(72) Inventors: Eric Mitchell Woolven, Toronto (CA); Marius K. Mortensen, Burlington (CA)

(73) Assignee: Veeva Systems Inc., Pleasanton, CA (US)

( * ) Notice: Subject to any disclaimer, the term of this patent is extended or adjusted under 35 U.S.C. 154(b) by 235 days.

(21) Appl. No.: 18/297,383

(22) Filed: Apr. 7, 2023

(51) Int. Cl.
- H04L 29/06 (2006.01)
- G06F 21/62 (2013.01)
- H04L 9/40 (2022.01)
- H04L 29/08 (2006.01)

(52) U.S. Cl.
CPC ........ G06F 21/6245 (2013.01); H04L 63/083 (2013.01); H04L 63/104 (2013.01)

(58) Field of Classification Search
CPC .. G06F 21/6245; H04L 63/083; H04L 63/104
USPC ............................................................ 726/4
See application file for complete search history.

(56) References Cited

U.S. PATENT DOCUMENTS

| | | | | |
|---|---|---|---|---|
| 10,496,840 | B1* | 12/2019 | Mehr | G06F 16/345 |
| 11,455,315 | B1* | 9/2022 | Ossher | G06F 16/254 |
| 2016/0182527 | A1* | 6/2016 | Lietz | G06F 21/604 726/6 |
| 2017/0010826 | A1* | 1/2017 | Basham | G06F 3/0619 |
| 2018/0176206 | A1* | 6/2018 | Matthews | H04L 63/083 |
| 2018/0373733 | A1* | 12/2018 | Andrew | G06Q 50/12 |
| 2019/0026048 | A1* | 1/2019 | Muehge | G06F 3/0649 |
| 2021/0081139 | A1* | 3/2021 | Goodman | G06F 3/0686 |
| 2021/0306334 | A1* | 9/2021 | Han | H04L 63/0884 |
| 2021/0306344 | A1* | 9/2021 | Han | H04L 63/08 |
| 2021/0306344 | A1* | 9/2021 | Han | H04L 63/083 |
| 2021/0306346 | A1* | 9/2021 | Han | H04L 63/083 |

OTHER PUBLICATIONS

Oracle, "Oracle Argus Safety—User Guide" Oct. 2020, Release 8.2.2, 206 pages printed (Year: 2020).

* cited by examiner

Primary Examiner — Haresh N Patel

(57) ABSTRACT

A method for accessing case datasets in a case dataset intake and management system. The method includes receiving access group data associated with an access group and including case assignment data and user assignment data. The method includes assigning multiple case datasets to the access group based on the case assignment data and assigning one or more user accounts of the account repository to the access group based on the user assignment data. The method includes receiving user computing device authentication data and the authenticating the user computing device authentication data. The method includes receiving a request including case criteria and selecting one or more of the case datasets assigned to the access group from the case repository based on the case criteria. The method includes outputting the selected one or more case datasets in response to the request and based on the user computing device authentication data.

20 Claims, 7 Drawing Sheets

FIG. 5B

SYSTEMS AND METHODS FOR PROVIDING SECURE MULTI-TIERED ACCESS TO CASE DATASETS

BACKGROUND

Researchers, scientists, industry players, academics, government regulators, and other stakeholders are increasingly in need of efficient and simple ways to provide secure access to case datasets.

SUMMARY

One embodiment relates to a method for accessing case datasets in a case dataset intake and management system. The case intake and management system includes a provider computing system. The provider computing system includes a case repository for storing case datasets and an account repository for storing user accounts. The method includes receiving access group data associated with an access group and including case assignment data and user assignment data. The method includes assigning multiple case datasets of the case repository to the access group based on the case assignment data. The method includes assigning one or more user accounts of the account repository to the access group based on the user assignment data. The method further includes receiving user computing device authentication data and authenticating the user computing device authentication data. The method further includes receiving a request for at least one case dataset including case criteria. The method further includes selecting one or more of the case datasets assigned to the access group from the case repository based on the case criteria. The method further includes outputting the selected one or more case datasets outputting in response to the request and based on the user computer device authentication data.

Another embodiment relates to a method for accessing case datasets in a case dataset intake and management system. The case intake and management system includes a provider computing system. The provider computing system includes a case repository for storing case datasets and an account repository for storing user accounts. The method includes receiving first access group data associated with a first access group and including first case assignment data and first user assignment data. The method includes receiving second access group data associated with a second access group and including second case assignment data and second user assignment data. The method includes assigning multiple first case datasets of the case repository to the first access group based on the first case assignment data. The method includes assigning multiple second case datasets of the case repository to the second access group based on the second case assignment data. The method includes assigning one or more first user accounts of the account repository to the first access group based on the first user assignment data. The method includes assigning one or more second user accounts of the account repository to the second access group based on the second user assignment data. The method further includes receiving first user computing device authentication data and authenticating the first user computing device authentication data. The method further includes receiving second user computing device authentication data and authenticating the second user computing authentication data. The method further includes receiving a first request for at least one case dataset including case criteria. The method further includes receiving a second request for at least one case dataset including the case criteria. The method further includes selecting one or more of the first case datasets assigned to the first access group from the case repository based on the case criteria. The method further includes selecting one or more of the second case datasets assigned to the second access group from the case repository based on the case criteria. The first case datasets and the second case datasets include no matching case datasets.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

FIGS. 5A-5C may be illustrations of some aspects of a user interface generated by the case dataset intake and management system of FIG. 1 to receive case access group data, according to an example embodiment.

DETAILED DESCRIPTION

Figure 1:
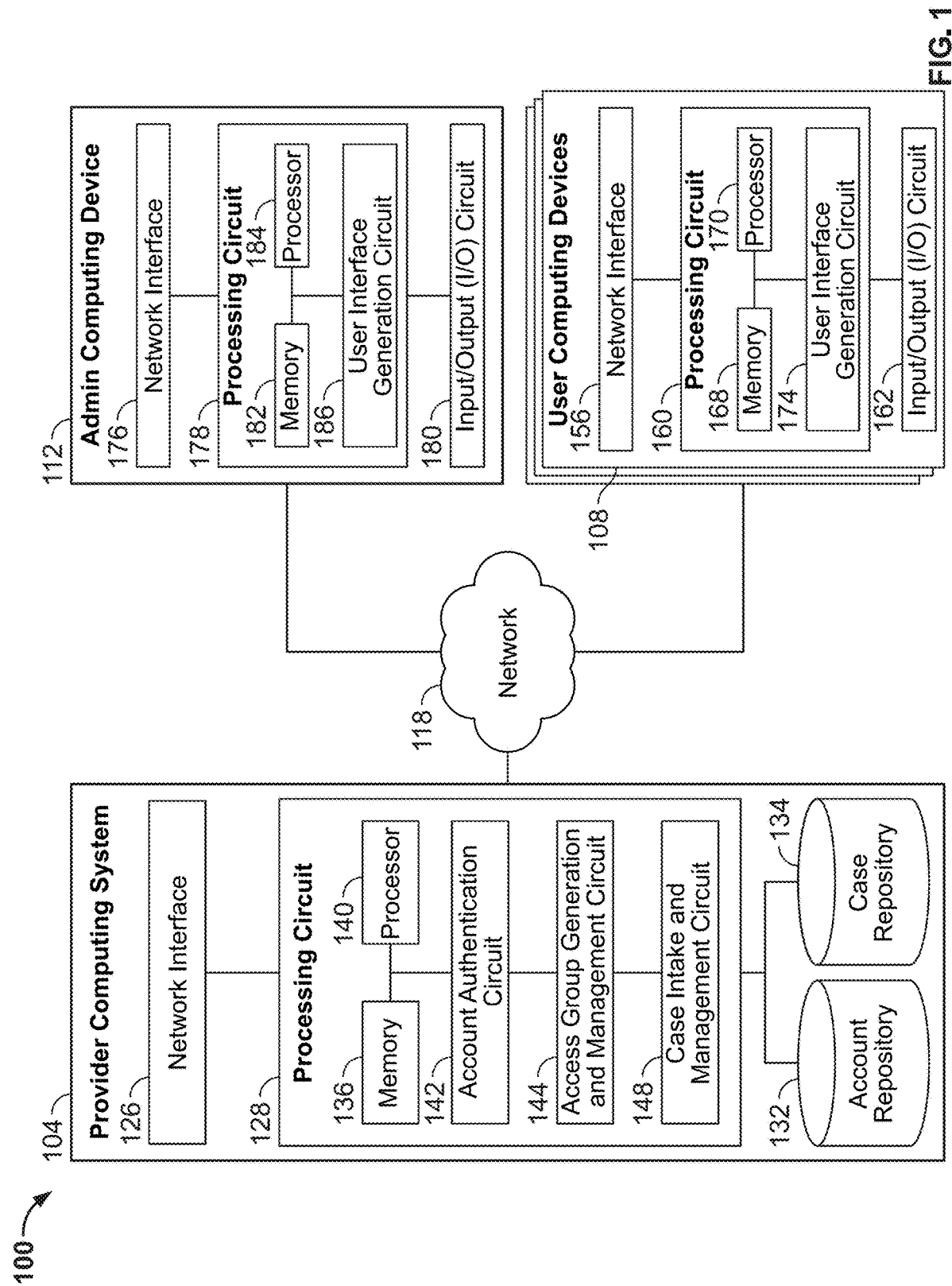
FIG. 1 may be component diagram of a case dataset intake and management system, according to an example embodiment.

Referring generally to the figures, systems and methods for providing secure multi-tiered access to case datasets are disclosed. The systems and methods described herein provide for enhanced security of case datasets by providing for multi-tiered and dynamic access to case datasets via case access groups, thereby helping and improving the pharmacovigilance industry by more accurately and securely providing for the intake and reporting of case datasets to health authorities. For example, by assigning one or more users and one or more case datasets to a specific case access group, the present systems and methods provide for multi-tiered access to case datasets that are within the user's case access group and prevent access to case datasets that are outside of the user's case access group. In comparison, typical case intake systems may not distinguish between users when providing for access to groups, thereby allowing users to access a variety of case datasets for which they may not be authorized to view and/or edit. In comparison, the present systems and methods may assign one or more specific user's and/or roles (e.g., job titles) in specific regions (e.g., US, China, Asia, Europe) to case access groups and then assign case datasets which are relevant and for which the users are authorized to access to the case access groups. Then, in response to the authenticating the user (e.g., via a username and password), the present systems and methods may provide the relevant case datasets to the user. By doing so, the present systems and methods prevent unauthorized access to case datasets and provide for a more dynamic and secure system in which the admin(s) can set the specific permission (and case datasets) each user has access to, which results in less cases being stolen, ending up in the wrong hands, or being handled by the wrong user(s), thereby improving case security.

Further, by masking specific portions of the case dataset based on blind access privileges and personally-identifying information (PII) privileges, the present systems and methods may provide for less violations of the law and unauthorized access to potentially compromising data/information. For example, because the systems and methods described herein receive blind access privileges and PII access privileges on a per user basis and then modify case datasets to remove or mask unauthorized case data (e.g., PII information (e.g., address, name, date of birth of patient), blinded study data (e.g., data indicating whether a patient received a placebo or a medical product), etc.), the present systems and methods provide for improved data control and prevent users from accessing data that may be illegal or could compromise a study. For instance, a clinical study may be a blinded study which tests the use of a medical product vs that of a placebo (e.g., a sugar pill). In such a blinded study, only a very select group of people or users may have access to the unblinded data indicating which patients are receiving the medical product and which patients are receiving the placebo to prevent bias. In typical case intake systems, this may be managed by blinding the data for every user and requiring a complex process to unblind any data. In comparison, the present systems and methods mask specific portions of the case dataset based on blind access privileges and personally-identifying information (PII) privileges on a per user basis. By doing so, the present systems and methods provide for a more secure environment to disclose potentially compromising information, which saves on system complexity (e.g., processing power and memory) and cost (when a study is compromised).

In an illustrative scenario, a provider computing system may receive access group data associated with an access group from an administrator (admin) computing device. In some embodiments, prior to receiving the access group data, the provider computing system 104 may authenticate the admin computing device (e.g., by receiving authentication data associated with the administrator). The access group data may include case assignment data for assigning one or more case datasets to the access group and user assignment data for assigning one or more users or user accounts to the access group. Next, the provider computing system may assign multiple case datasets to the access group based on the case assignment data. The provider computing system 104 may assign multiple user accounts to the access group based on the user assignment data. Next, the provider computing system may receive authentication data from a user computing device and authenticate the user computing device based on the authentication data. Once the user computing device is authenticated, the provider computing system may receive a request including case criteria or search criteria from the user computing device. Then, the provider computing system may select one or more case datasets (which are assigned to the access group) from a case repository based on the case criteria. Next, the provider computing system may output or provide the selected case datasets to the user computing device.

As used herein, the term "event," "medical event," or "adverse event" can include any untoward medical occurrence which happens to either a patient or a subject in a clinical investigation or during regular use of a medical product that has been given to that person. For example, the "event," "medical event," or "adverse event" may encompass any signs which are unfavorable and unexpected for the patient or subject, including any abnormal laboratory findings such as a high blood pressure, a rapid heart rate, etc. The "event," "medical event," or "adverse event" could be symptoms, or a disease temporally associated with the use of a medical product and does not have to have been previously associated with that product. The term "event," "medical event," or "adverse event" can further encompass adverse reactions and serious adverse events such as death, life-threatening adverse experiences, inpatient hospitalization, congenital birth defects, disabilities, etc. Further, each "event," "medical event," or "adverse event" may be defined by the Medical Dictionary for Regulatory Activities (MedDRA) (or other medical code dictionaries) and associated with a specific MedDRA code. Moreover, "event information" "medical event information" "adverse event information" "event data" "medical event data" or "adverse event data" can include information associated with the event such as the date of onset of the event, the date of cessation of the event, the type of event, the dictionary (i.e., digital dictionary, medical dictionary, digital medical dictionary, etc.) or medical term (e.g., MedDRA term), the dictionary or medical code (e.g., MedDRA code), event comments, the outcome of the event, the location of the event (e.g., country where the event occurred), the event duration, patient data for a patient who endured or to which the event occurred, medical products that the patient consumed and/or dosages for the consumed medical products, the event rank, event contacts, the event type, and any associated event documents.

As used herein, the term "case" or "case dataset" can include an Individual Case Safety Report (ICSR) as defined by the standard ISO/HL7 27953 of the International Standards Organization (ISO) as well as any past or future standards governing ICSRs of the ISO, the World Health Organization (WHO), the Food and Drug Administration (FDA), the European Medicines Agency (EMA), or other national health agencies governing ICSRs. Moreover, "case information" "case data" or "case dataset" can include information associated with or included in the case such as adverse event data, case contact data, case identifier (e.g., case worldwide ID (WWID), case number, etc.), case priority data, case seriousness data, case documents, medical product data, medical product registrations, patient data, and other data associated with a case as defined by the standard ISO/HL7 27953 as well as any past or future standards governing ICSRs of the ISO, the WHO, the FDA, the EMA, or other national health agencies governing ICSRs.

Referring now to FIG. 1, a system 100 for providing secure multi-tiered access to case datasets is shown, according to an example embodiment. The system 100 includes a provider computing system 104, multiple user computing devices 108, and one or more administrator (admin) computing devices 112 connected by a secure network (e.g., a network 118).

The network 118 communicably and operably couples the provider computing system 104, the user computing devices 108, and the admin computing device 112 such that communicable and operable computing may be provided between the provider computing system 104, the user computing devices 108, and the admin computing device 112 over the network 118. In various embodiments, the network 118 includes any combination of a local area network (LAN), an intranet, the Internet, or any other suitable communications network, directly or through another interface.

The provider computing system 104 may be operated and managed by a provider (e.g., a software as a service (SaaS)

provider, a cloud services provider, a software provider, a service provider, etc.) and may include a computer system (e.g., one or more servers (e.g., a cloud computing server) each with one or more processing circuits). In some embodiments, the provider computing system 104 may act as a host and provide an application (e.g., a web-based application, a mobile application, etc.) to the user computing device 108 over the network 118 in response to authenticating the respective computing device. For example, the provider computing system 104 may receive authentication data (e.g., a username and corresponding password, a limited-use key, a two-factor authentication code or key, etc.) from one of the user computing devices 108. The provider computing system 104 may then authenticate the user computing device 108 based on the authentication data and provide an application to the user computing device 108 over the network 118. In some examples, the provider computing system 104 may be a multi-tenant system where various elements of hardware and software may be shared by one or more customers. In a multi-tenant system, a user is typically associated with a particular customer. In one example, a user (e.g., of the user computing device 108) could be an employee of one of a number of (pharmaceutical) companies which are tenants, or customers, of the provider computing system 104.

In some embodiments, the provider computing system 104 may run on a cloud computing platform. Users can access content on the cloud independently by using a virtual machine image or purchasing access to a service maintained by a cloud repository provider.

In some embodiments, the provider computing system 104 may be provided as Software as a Service ("SaaS") to allow users to access the provider computing system 104 with a thin client.

As shown, the provider computing system 104 may include a network interface 126, a processing circuit 128, an account repository 132, and a case repository 134. In some embodiments, the provider computing system 104 may include an input/output circuit (e.g., similar to (e.g., the same as) an input/output circuit 162 as will described further herein).

The network interface 126 is structured to establish connections with the user computing devices 108 and the admin computing device 112 by way of the network 118. The network interface 126 includes program logic and/or hardware-based components that connect the provider computing system 104 to the network 118. For example, the network interface 126 may include any combination of a wireless network transceiver (e.g., a cellular modem, a broadband modem, a Bluetooth transceiver, a Wi-Fi transceiver, a Li-Fi transceiver, etc.) and/or a wired network transceiver (e.g., an Ethernet transceiver). In some embodiments, the network interface 126 includes the hardware and machine-readable media structured to support communication over multiple channels of data communication (e.g., wireless, Bluetooth, near-field communication (NFC). In some embodiments, the network interface 126 includes cryptography logic and capabilities to establish a secure communications session.

The processing circuit 128, as shown, comprises a memory 136, a processor 140, an account authentication circuit 142, an access group generation and management circuit 144, and a case intake and management circuit 148. The memory 136 includes one or more memory devices (e.g., RAM, NVRAM, ROM, flash memory, hard disk storage, etc.) that store data and/or computer code for facilitating the various processes described herein. That is, in operation and use, the memory 136 stores at least portions of instructions and data for execution by the processor 140 to control the processing circuit 128. The memory 136 may be or include tangible, non-transient volatile memory and/or non-volatile memory. The processor 140 may be implemented as a general-purpose processor, an application specific integrated circuit (ASIC), one or more field programmable gate array (FPGAs), a digital signal processor (DSP), a group of processing components or other suitable electronic processing components.

As described herein, the account authentication circuit 142 is structured or configured to receive authentication data, authenticate the authentication data, and associate the user computing device 108 from which the authentication data was received with specific permissions. For instance, the account authentication circuit 142 may be configured or structured to receive authentication data (e.g., username and password, electronic address (e.g., IP address, FTP address, or other addresses from which the authentication data is received), limited-use key, etc.) from a user computing device 108 during a log-in process. The account authentication circuit 142 may then authenticate the authentication data by determining if the authentication data matches authentication data stored in the account repository 132. Then, in response to authenticating the user computing device 108, the account authentication circuit 142 may assign or associate specific permissions (e.g., a specific case access group) to the user computing device 108 based on the received authentication data. For instance, the authentication data may indicate the user computing device 108 is associated with the user (John Smith) based on the authentication data received from the user computing device 108 (e.g., the username and password associated with John Smith). Accordingly, the account authentication circuit 142 may assign the user computing device 108 the permissions associated with the authentication data and John Smith.

In some embodiments, the account authentication circuit 142 may assign the permissions to the electronic address of the user computing device 108 for a specific period of time. In this regard, when a request is received from the electronic address, the provider computing system 104 may determine the user computing device 108 has the specific permissions based on electronic address. Then, when the specific period of time has passed, the user computing device 108 may again provide authentication data. In other embodiments, the account authentication circuit 142 may provide the authentication data to the access group management circuit 144 which may assign the permissions to the user computing device 108.

The access group generation and management circuit 144 is structured or configured to generate and manage case dataset access groups. For example, the access group generation and management circuit 144 may receive case dataset assignment data (e.g., all US cases, all marketed medical products, all medical products that are currently within a study, all cases that need to be reported to the FDA, etc.) and user assignment data (e.g., John Smith, Jacob Smith, Teresa Smith, etc.) from the admin computing device 112. In response, the access group generation and management circuit 144 may generate an access group that includes each and store the access group within the account repository 132. Then, the provider computing system 104 may parse through each case dataset in the case repository 134 and assign one or more of the case datasets to the access group based on the case dataset assignment data. In some embodiments, the access group generation and management circuit 144 may further search the account repository 132 for each user of the user assignment data and assign each user to the access group.

As described herein, the case intake and management circuit 148 is structured or configured to receive, generate, store, and manage case datasets. For instance, the case intake and management circuit 144 may be configured or structured to receive or retrieve adverse event data associated with an adverse event from a trusted source (one of the user computing devices 108, a health-agency computing system (e.g., the FDA Gateway) (not shown)). The case intake and management circuit 148 may then match the adverse event data with medical product data of a medical product repository (not shown), generate a case dataset including case data, and store the case dataset within the case repository 134. In one example, the case intake and management circuit 144 may be an instance of Vault Safety®.

Additionally, the case intake and management circuit 148 may be configured or structured to retrieve cases from the case repository, in response to receiving a request including case criteria (e.g., a medical product of the case, a date of the case, a state of the case (e.g., open, closed, submitted, pending review), a country in which the case took place, etc.) from one of the user computing devices 108. The request may include or identify a sender address (e.g., an IP address, an FTP address, an email address) and/or authorization data. In response, the case intake and management circuit 148 may determine the case access group associated with the user computing device 108 and select one or more case datasets from the case repository 134 based on the case criteria and the case access group. In some embodiments, the case intake and management circuit 148 may further modify the case dataset(s) based on the case access group. For instance, the case access group may indicate the user does not have access to personally identifying information (PII). Accordingly, the case intake and management circuit 148 may remove or mask any PII included in the case dataset(s) (e.g., patient name, patient date of birth, patient address, etc.).

The account repository 132 may be repository (e.g., a database) that is structured or configured to receive, store, and manage accounts of users (e.g., of the user computing devices). In this regard, the account repository 132 may receive, store, and manage authentication data therein. For example, the account repository 132 may receive one or more new user accounts from the admin computing device 112 including authorization data for each account (e.g., username, password, two-factor authorization contact addresses, etc.) and store the new user accounts therein. Then, in response to receiving a request for authentication data, the account repository 132 may output any matching authentication data. Accordingly, the account 132 can be structured according to various database types, such as, relational, hierarchical, network, flat, point-in time, and/or object relational. Further, the account repository 132 includes a plurality of nonvolatile/non-transitory storage media such as solid-state storage media, hard disk storage media, virtual storage media, cloud-based storage drives, storage servers, and/or the like.

In some embodiments, the account repository 132 may receive, store, and manage access groups and access group data (e.g., case dataset assignment data, user assignment data, etc.) therein. For instance, the access group generation and management circuit 144 may generate an access group including case dataset assignment data and one or more users and provide the access group to the account repository 132 for storage. The account repository 132 may store the access group with association (e.g., a reference pointer or reference to) the one or more user(s) of the access group. For instance, the access group may include the users person 1, person 2, and person 3. Further, person 1 may be associated with or be assigned user account 1; person 2 may be associated with user account 2; and person 3 may be associated with user account 3. Accordingly, the access group may be associated with or include a reference pointer to account 1, account 2, and account 3, and vice versa. In other embodiments, the access group and the access group data may be stored and managed by an access group repository (not shown) that is separate from the account repository 132 (but may be structured the same).

Likewise, the case repository 134 may be repository (e.g., a database) that is structured or configured to receive, store, and manage case datasets and their respective data (e.g., case data, adverse event data, etc.). For example, the case repository 134 may receive case datasets and related case objects and store the case datasets therein. Then, in response to receiving a query or a request for one or more case datasets (e.g., a query for all cases that include a specific medical term and/or code) the case repository 134 may provide and/or return the case datasets stored therein that match the query or request. For example, the case repository 134 may receive a query from the case intake and management circuit 148 for all cases that include a specific criteria (e.g., a specific medical (MedDRA) code). In response, the case repository 134 may determine each case dataset that includes the specific medical code stored therein and return each case dataset. In some embodiments, the case dataset may include or identify the access group(s) to which the case dataset is assigned (e.g., based on the case dataset assignment data). Therefore, in another example, the case repository 134 may receive a query from the case intake and management circuit 148 for all cases that include a specific criteria (e.g., a specific medical product) and are assigned to a specific access group. In response, the case repository 134 may determine each case dataset that includes or is associated with the specific medical product and the specific access group therein and return each case dataset. Further, the case repository 134 can be structured according to various database types, such as, relational, hierarchical, network, flat, point-in time, and/or object relational. In some embodiments, the case repository 134 includes a plurality of nonvolatile/non-transitory storage media such as solid-state storage media, hard disk storage media, virtual storage media, cloud-based storage drives, storage servers, and/or the like. In some embodiments, the provider computing system 104 may include a separate case repository 134 for each customer or sponsor, thereby keeping the case datasets of each customer separate.

Still referring to FIG. 1, the user computing devices 108 can each be any type of computing device or computing system. For instance, each user computing device 108 can be one or more of a mobile phone, a tablet computer, a laptop computer, a smart watch, a server computer system, or any other internet-connected device. In operation, the user computing devices 108 may communicate and interface with the provider computing system 104 via the network 118 to provide authorization credentials and a request for case datasets including case criteria. In response, the provider computing system 104 may provide one or more case datasets to the respective user computing device 108. As shown, each user computing device 108 may include a network interface 156, a processing circuit 160, and the input/output (I/O) circuit 162.

As described herein, each user computing device 108 may be associated with a different user who may have a different role within a specific company (e.g., CEO, Chief Safety Officer (CSO), case processor (USA), case processor (EMA), medical reviewer, etc.). In this regard, each different user and associated user computing device 108 may be associated with a specific address (e.g., email address, IP address, etc.), a specific account, and a specific case access group. For example, the user computing device 108 associated with the CSO may be associated with the case access group (All Access) which has access to all case datasets; whereas the user computing device associated with a case processor (USA) may be associated with the case access group (Cases-USA) which has access to case datasets which originated (i.e., were first reported) in the USA or with a specific health agency (e.g., the FDA) and are to be submitted in the USA. In this regard, each user computing device 108 may have access to different case datasets (based on the case access group and the account of the user). For example, a first user computing device 108 may generate a request for case datasets with a first case criteria (e.g., a specific medical code) and receive a first set of case datasets. Then, a second user computing device 108 may generate a request for case datasets with a second case criteria that is the same as the first case criteria. The first user computing device 108 and the second user computing device 108 may be associated with different access groups. Accordingly, the second user computing device 108 may receive a second set of case datasets which is entirely different than the first set of case datasets.

The network interface 156 is structured to establish connections with the provider computing system 104 by way of the network 118. The network interface 156 includes program logic and/or hardware-based components that connect the user computing device 108 to the network 118. For example, the network interface 156 may include any combination of a wireless network transceiver (e.g., a cellular modem, a broadband modem, a Bluetooth transceiver, a Wi-Fi transceiver, a Li-Fi transceiver, etc.) and/or a wired network transceiver (e.g., an Ethernet transceiver). In some embodiments, the network interface 156 includes the hardware and machine-readable media structured to support communication over multiple channels of data communication (e.g., wireless, Bluetooth, near-field communication (NFC). In some embodiments, the network interface 156 includes cryptography logic and capabilities to establish a secure communications session.

The processing circuit 160, as shown, comprises a memory 168, a processor 170, and a user interface generation or rendering circuit 174. The memory 168 includes one or more memory devices (e.g., RAM, NVRAM, ROM, flash memory, hard disk storage, etc.) that store data and/or computer code for facilitating the various processes described herein. That is, in operation and use, the memory 168 stores at least portions of instructions and data for execution by the processor 170 to control the processing circuit 160. The memory 168 may be or include tangible, non-transient volatile memory and/or non-volatile memory. The processor 170 may be implemented as a general-purpose processor, an application specific integrated circuit (ASIC), one or more field programmable gate array (FPGAs), a digital signal processor (DSP), a group of processing components or other suitable electronic processing components.

The user interface rendering circuit 174 may be configured to receive a user interface (e.g., a web interface in an HTML file and related files, a downloaded graphical user interface, etc.) from the provider computing system 104 and render the user interface on the user computing device 108 via the I/O circuit 162. In this way, the provider computing system 104 may generate one or more user interfaces and provide the one or more user interfaces to the user interface generation circuit 174 to be rendered on the user computing device 108 (e.g., on a display of the I/O circuit 162 of the user computing device 108).

The I/O circuit 162 is structured to receive communications from and provide communications to the user of the user computing device 108 (e.g., the user). In this regard, the I/O circuit 162 is structured to exchange data with the processing circuit 160 to provide output to the user and to receive input from the user. As a result, the I/O circuit 162 may include a display that may be manipulated by the application. In some embodiments, the I/O circuit 162 may also include a keyboard, a mouse, a joystick, a touch screen, touch areas, soft keys, a microphone, a speaker, a vibration mechanism, a sensor, a RFID scanner, or other input/output devices described herein.

Still referring to FIG. 1, the admin computing device 112 can be any type of computing device or computing system. For instance, the admin computing device 112 can be one or more of a mobile phone, a tablet computer, a laptop computer, a smart watch, a server computer system, or any other internet-connected device. In operation, the admin computing device 112 may communicate and interface with the provider computing system 104 via the network 118 to provide authorization credentials and a request to generate one or more case access groups, the request including case dataset assignment data and user assignment data. As described herein, the admin computing device 112 may be associated with an administrator who may have authorization credentials of an administrator. In this regard, the admin computing device 112 may be a user computing device 108 with admin authorization credentials and may be substantially the same as the user computing devices 108. For example, the admin computing device 112 may include a network interface 176 (which may be the same as the network interface 156), a processing circuit 178 (which may be the same as the processing circuit 160), and the input/output (I/O) circuit 180 (which may be the same as the I/O circuit 162).

The network interface 176 is structured to establish connections with the provider computing system 104 by way of the network 118. The network interface 176 includes program logic and/or hardware-based components that connect the user computing device 108 to the network 118. For example, the network interface 176 may include any combination of a wireless network transceiver (e.g., a cellular modem, a broadband modem, a Bluetooth transceiver, a Wi-Fi transceiver, a Li-Fi transceiver, etc.) and/or a wired network transceiver (e.g., an Ethernet transceiver). In some embodiments, the network interface 176 includes the hardware and machine-readable media structured to support communication over multiple channels of data communication (e.g., wireless, Bluetooth, near-field communication (NFC). In some embodiments, the network interface 176 includes cryptography logic and capabilities to establish a secure communications session.

The processing circuit 178, as shown, comprises a memory 182, a processor 184, and a user interface generation or rendering circuit 186. The memory 182 includes one or more memory devices (e.g., RAM, NVRAM, ROM, flash memory, hard disk storage, etc.) that store data and/or computer code for facilitating the various processes described herein. That is, in operation and use, the memory 182 stores at least portions of instructions and data for execution by the processor 184 to control the processing circuit 178. The memory 182 may be or include tangible, non-transient volatile memory and/or non-volatile memory. The processor 184 may be implemented as a general-purpose processor, an application specific integrated circuit (ASIC), one or more field programmable gate array (FPGAs), a digital signal processor (DSP), a group of processing components or other suitable electronic processing components.

The user interface rendering circuit 186 may be configured to receive a user interface (e.g., a web interface in an HTML file and related files, a downloaded graphical user interface, etc.) from the provider computing system 104 and render the user interface on the admin computing device 112 via the I/O circuit 180. In this way, the provider computing system 104 may generate one or more user interfaces and provide the one or more user interfaces to the user interface generation circuit 186 to be rendered on the admin computing device 112 (e.g., on a display of the I/O circuit 180 of the admin computing device 112).

The I/O circuit 180 is structured to receive communications from and provide communications to the user of the admin computing device 112 (e.g., the admin). In this regard, the I/O circuit 180 is structured to exchange data with the processing circuit 178 to provide output to the user and to receive input from the admin. As a result, the I/O circuit 180 may include a display that may be manipulated by the application. In some embodiments, the I/O circuit 180 may also include a keyboard, a mouse, a joystick, a touch screen, touch areas, soft keys, a microphone, a speaker, a vibration mechanism, a sensor, a RFID scanner, or other input/output devices described herein.

Figure 2:
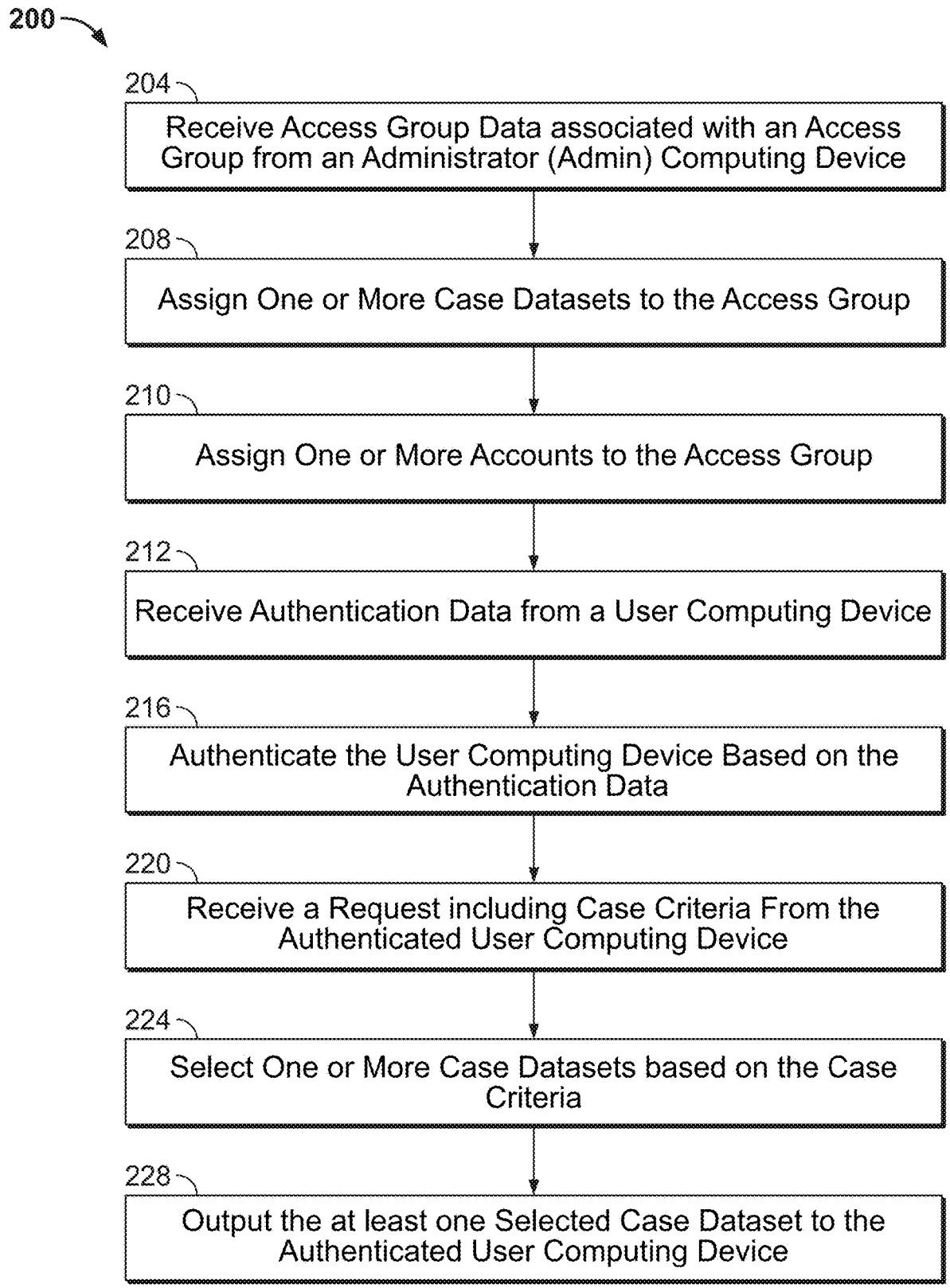
FIG. 2 may be a flow diagram of a method for accessing one or more case datasets via a case access group, according to an example embodiment.

Referring now to FIG. 2, a method 200 of accessing one or more case datasets via a case access group shown, according to an example embodiment. Method 200 can be carried out by the system of FIG. 1. More particularly, the method 200 can be carried out by the processing circuit 128 of the provider computing system 104 and through communication with the user computing devices 108 and the admin computing device 112.

Method 200 commences at step 204 at which the provider computing system 104 receives (case) access group data, which may be associated with one or more access groups. The access group data may include case assignment data or rules and user assignment data, which will be described further herein. In some embodiments, the access group data may include blinded access privileges or data and/or PII access privileges or data that indicate whether the access group has access to blinded case data and PII case data, respectfully. In other embodiments, the blinded access privileges and the PII access privileges may be account specific and included in the user assignment data. In some embodiments, the access group data is received in a request to generate a new access group. In other embodiments, the access group data is received in a request to alter an existing access group.

In some embodiments, the access group data is received from the admin computing device 112. For instance, prior to step 204, the admin computing device 112 may provide authentication data to the provider computing system 104. In response, the provider computing system 104 may search or query the account repository 132 for the authentication data and find matching authentication data (e.g., authentication data that matches the received authentication data). Further, the authentication data returned from the account repository 132 may be associated with administrator credentials or an admin user and have administrative privileges (e.g., authorization to generate, manage, and delete case access groups and their associated data). In other embodiments, the access group data is received from one of the user computing devices 108

In some embodiments, after receiving the access group data, the provider computing system 104 may generate the access group and/or an access group data object. For instance, if the access group data is received in a request to generate a new access group, the provider computing system 104 may generate an access group and/or an access group data object including the case assignment data and the user assignment data. In some embodiments, after receiving the access group data, the provider computing system 104 may select or query the access group from the account repository 132 or the access group repository (not shown). For instance, if the access group data is received in a request to modify or alter an existing access group, the provider computing system 104 may search the account repository 132 for the access group and/or an access group data object. Then, the provider computing system 104 may update the access group and/or the access group data object to include the case assignment data or the user assignment data of the request.

In some embodiments, prior to step 204, the provider computing system 104 may receive case access group preferences (also referred to as blind preferences and PII preferences) from the admin computing device 112. The case access group preferences will be described further herein with regard to the access group preferences page 300, but may specify which fields or pieces of case data are to be masked or hidden in response to an account not having the blind or PII privileges. In some embodiments, after receiving the case access group preferences, the provider computing system 104 may store them in the account repository 132 or the access group repository (not shown).

Once the provider computing system 104 has received the access group data, the method 200 proceeds to step 208 at which the provider computing system 104 assigns one or more case datasets to the access group. As described herein, the access group data may include case assignment data or rules which may specify the criteria for a case dataset to be assigned to the access group. For instance, the case assignment data may indicate a case dataset is to be assigned to the access group if it originated or is to be reported in a specific country or jurisdiction (e.g., the USA), if it is associated with a medical product in a clinical study (e.g., is a study case), if it is associated with a marketed medical product (e.g., is a marketed case), based on the sponsor or customer of the case, based on the state (e.g., open, closed, submitted, medical review, etc.) of the case, based on the medical product of the case, based on the seriousness of the case (e.g., serious-resulted in death, non-serious, serious-birth defect, etc.), and based on other case data. For example, the case assignment data may indicate a case dataset is to be assigned to the access group ("Europe-Study"), in response to the case dataset originating or being reported in Europe and the case dataset including or being associated with a medical product that is undergoing a clinical study. In another example, the case assignment data may indicate a case dataset is to be assigned to the access group ("Worldwide-Marketed"), in response to the case dataset being reported in multiple countries worldwide and the case dataset including or being associated with a medical product that is currently marketed. While these are a few examples, it should be understood that many combinations of case data may be utilized and indicated in the case assignment data, and that such combinations are within the scope of the present disclosure.

In some embodiments, to assign each case to the access group, the provider computing system 104 (and more particularly the access group generation and management circuit 144) may search or query the case repository 134 for each case dataset that matches or meets the case assignment data or rules. For instance, using the ("Europe-Study") example above, the provider computing system 104 may search or query the case repository 134 for each case dataset that was reported or originated in Europe and is associated with or includes a medical product that is undergoing a clinical study. In response, the case repository 134 may return each matching case dataset and/or case dataset data object. The provider computing system 104 may then add the case access group to the case data of the case dataset or the case dataset data object. For instance, the provider computing system 104 may add a reference or an association (e.g., a link, a reference pointer, a name) to the access group in the case dataset data object, and then store the updated case dataset and/or case dataset data object in the case repository 134. The reference will be described further herein, but may be used when determining which case dataset(s) to return to a specific user. In other embodiments, the provider computing system 104 may add reference or an association (e.g., a link, a reference pointer, a name) for each returned case dataset (from the case repository 134) to the case access group data or a case access group data object, and then store the case access group and/or the case access group in the case repository 134.

Once the provider computing system 104 has assigned one or more case datasets to the access group, the method 200 proceeds to step 210 at which the provider computing system 104 assigns one or more accounts or users to the access group. As described herein, the access group data may include user assignment data or rules which may specify the user accounts or the criteria for an account to be assigned to the access group. For instance, the user assignment data may indicate a user's account is to be assigned to the access group if they have a specific title (e.g., case processor-USA, CSO, CEO, head or research, medical reviewer, etc.), or if they work in a specific location or office (e.g., North Carolina, USA; UK, Europe, Japan, Asia; etc.). In another example, the user assignment data may include or specify specific accounts (e.g., usernames, names, emails, etc.) which are to be assigned to the access group.

In some embodiments, to assign each user or account to the access group, the provider computing system 104 (and more particularly the access group generation and management circuit 144) may search or query the account repository 132 for each account that includes one of the users identified in the user assignment data. In response, the account repository 132 may return each matching account and/or account data object. The provider computing system 104 may then add the case access group to the account data of the account. For instance, the provider computing system 104 may add a reference or an association (e.g., a link, a reference pointer, a name) to the case access group in the account or the account data object, and then store the updated account data and/or account data object in the account repository 132. In other embodiments, the provider computing system 104 may add reference or an association (e.g., a link, a reference pointer, a name) for each returned account (from the account repository 132) to the case access group data or a case access group data object, and then store the account or the account data object in the account repository 132.

In some embodiments, the user assignment data may further include or specify blind access privileges and PII access privileges for each specific account or user. The blind access privileges may be used in determining if the account has access to specific unblinded case data. As described herein, case data may be blinded in clinical studies or trials to blindly determine the affect a medical product has when compared to a placebo or another medical product. In this regard, to prevent bias, the patient and other people associated with the clinical study (e.g., the prescribing physician, case processors, etc.) may be unaware of which product (e.g., the medical product, the placebo, another medical product) was provided to the patient. In this regard, the case data may include multiple fields or portions (e.g., medical product name, medical product dosage, medical product substance(s), etc.) that are blinded or masked to specific accounts. For example, an account with blind access privileges may see the medical product name "Placebo"; whereas, an account with no blind access privileges may see the medical product name "****" or "Blinded" or "xxxxx".

Likewise, the PII access privileges may be used in determining if the account has access to specific PII. As described herein, case data may include personally identifying information or data of patients that is private and protected by the law (e.g., the Health Insurance Portability and Accountability Act (HIPAA)). Accordingly, to protect the patient and their privacy, only specific accounts or users may have access to the PII, while the PII is masked or hidden to other specific accounts. For example, an account with PII access privileges may see the name "John Smith" or the address 111 Address St., Milwaukee WI, 53209; whereas, an account with no blind access privileges may see the name "**" or "J.S." or "xxxxx" and the address "" or "xxxxx". In some embodiments, the provider computing system 104** may add the blind access privileges and the PII access privileges for each specific account to the account data as part of assigning the account to the access group.

Once the provider computing system 104 has assigned one or more accounts to the access group, the method 200 proceeds to step 212 at which the provider computing system 104 receives authentication data (also referred to as user computing device authentication data) from one of the user computing devices 108. As described herein, the authentication data may be or include a username, a password, a one-time use key, a two-factor authentication code, and/or an electronic address (e.g., IP address, email address, FTP address, network address, etc.). For example, a user of the user computing device 108 may wish to access one or more case datasets of the provider computing system 104 and begin a log-in process. Accordingly, via the network 118, the user computing device 108 may access a specific Uniform Resource Locator (URL) associated with the provider computing system 104 and be prompted with a log-in page (not shown) by providing a request to access the URL with the IP address of the user computing device 108. The log-in page may request authentication data of an account previously setup by the user or the user's employer. Then, via the log-in page, the user of the user computing device 108 may provide their authentication data, which may then be provided, by the respective user computing device 108, to the provider computing system 104. In one example, the user may provide a username (e.g., an email address) and matching password. In response, the provider computing system 104 may request a two-factor authentication code and provide the two-factor authentication code to the user (e.g., at an electronic address of the user computing device 108, at a phone number of the user, at an email address of the user, etc.). The user of the user computing device 108 may receive the two-factor authentication code, and provide it to the provider computing system 104 via the log-in page. In this way, the provider computing system 104 may receive authentication data including the IP address of the user computing device 108, the username, the password, and the two-factor authentication code of the user. This same process may be used by the provider computing system 104 to authenticate the admin computing device 112, as described herein.

Once the provider computing system 104 has received the authentication data, the method 200 proceeds to step 216 at which the provider computing system 104 authenticates the user computing device 108 based on the authentication data. To authenticate the specific user computing device 108 and/or the authentication data, the provider computing system 104 may search the account repository 132 for an account including authentication data that matches the received authentication data. For instance, the provider computing system 104 may query or search the account repository 132 for a username that matches the username of the received authentication data (e.g., john.smith@company123.com). Then, in response to returning a matching account, the provider computing system 104 may determine the password matches a password of the matching account. Further, the provider computing system 104 may determine the two-factor authentication code matches the two-factor authentication code provided to the user. Then, in response to each piece of authentication data matching that stored in the account repository 132, the provider computing system 104 may determine the user computing device 108 is authenticated.

In some embodiments, in response to authenticating the user computing device 108, the provider computing system 104 may provide a limited-use key (LUK) (e.g., of a key repository (not shown)) to the user computing device 108. Further, the provider computing system 104 may add a LUK-account pair to the account repository 132, the key repository (not shown), and/or LUK lookup table which may indicate the LUK is associated with the authenticated account for which the user computing device 108 provided authentication data. In this regard, for a limited time (e.g., one hour, two hours, four hours, one day, etc.) the user computing device 108 may provide the LUK along with any requests, and the provider computing system 104 may determine the request is coming from the authenticated account of the user computing device 108, based on the LUK. In other embodiments, in response to authenticating the user computing device 108, the provider computing system 104 may add the electronic (also referred to as sender) address (e.g., the IP address, the domain name, etc.) of the user computing device 108 to the account repository 132 or a electronic address lookup table which may indicate the electronic address is associated with the authenticated account for which the user computing device 108 provided authentication data. In this regard, for a limited time (e.g., one hour, two hours, four hours, one day, etc.) the user computing device 108 may provide requests from the electronic address, and the provider computing system 104 may determine the request is coming from the authenticated account of the user computing device 108, based on the electronic address.

Once the provider computing system 104 has authenticated the user computing device 108 based on the authentication data, the method 200 proceeds to step 220 at which the provider computing system 104 receives a request for one or more case datasets including case criteria or case search criteria from one of the user computing devices 108. The request may be received from the authenticated user computing device 108. In some embodiments, the request may further include a LUK or a sender address. For instance, the provider computing system 104 may receive the request including the case criteria and a LUK from one of the user computing devices 108. In response, the provider computing system 104 may look up or search the LUK in the LUK lookup table and determine the LUK is associated with a specific account of the account repository 132 and that the user computing device 108 is authenticated. In another example, the provider computing system 104 may receive the request including the case criteria and a sender address (e.g., an IP address) from one of the user computing devices 108. In response, the provider computing system 104 may look up or search the sender address in the electronic address lookup table and determine the electronic address is associated with a specific account of the account repository 132 and that the user computing device 108 is authenticated.

In some embodiments, at or after steps 216 or 220, the provider computing system 104 may determine the case access group of the user computing device 108. For instance, as a part of authenticating the user computing device 108 at step 216, the provider computing system 104 may further determine the case access group of the authenticated account. As described herein, the case access group for the account may be stored in the account data or the account data object. Accordingly, while authenticating the account of the user computing device 108, the provider computing system 104 may further associate the case access group of the account with the LUK or the electronic address. In other embodiments, in response to receiving the request including the case criteria, the provider computing system 104 may search the account repository 132 for the account matching the LUK and determine the case access group of the account. In this regard, prior to step 224, the provider computing system 104 may determine the case access group of the account.

Once the provider computing system 104 has received the request including the case criteria, the method 200 proceeds to step 224 at which the provider computing system 104 selects one or more case datasets based on the case criteria. As described herein, the provider computing system (and more particularly, the case intake and management circuit 148) may select the case datasets from the case repository 134 based on the case criteria. The case criteria may include or specify one or more fields of the case data. For instance, the case criteria may identify a specific medical product (e.g., a medical product identifier (e.g., a national drug code (NDC)), a specific medical code, a date or set of dates within which the case was generated or received, a specific country of origin, and the like. In this regard, the provider computing system 104 may search the case repository 134 for case datasets that match the case criteria of the request and receive or select the matching case datasets, in response.

In some embodiments, at step 224, the provider computing system 104 may select one or more case datasets from the case repository 134 based on the case criteria and the case access group of the authenticated account. For instance, as described herein, at step 208, each case dataset may be assigned to one or more case access groups. Accordingly, at step 224, the provider computing system 104 may search the case repository 134 for cases that match the case criteria (e.g., include case data that matches the case criteria) and that are in the case access group of the authenticated account. For example, an account may be assigned the case access group (US-Marketed) and therefore have access to case datasets that are for marketed medical products and originated in the US. Additionally, based on the case assignment data of the case access group, multiple case datasets may be assigned to the same case access group (US-Marketed). Then, at step 224, the provider computing system 104 may search for case datasets that are assigned to the case access group (US-Marketed) and match or meet the case criteria (e.g., include a specific medical product code).

Once the provider computing system 104 has selected the one or more case datasets from the case repository 134, the method 200 proceeds to step 228 at which the provider computing system 104 outputs the one or more case datasets to the authenticated user computing device 108. The one or more selected case datasets may be output in response to the request and based on the authentication data (e.g., based on the LUK of the request, etc.). In some embodiments, the one or more case datasets may be output to the user computing device 108 via a user interface and case page or case management page (not shown). In other embodiments, the one or more case datasets may be output as an E2B R2 or R3 (XML) file and via the AS2 communication protocol. In other embodiments, the one or more case datasets may be output as an email to the electronic address (e.g., email address) of the authenticated user computing device 108.

In some embodiments, prior to step 228 (e.g., at step 224, after step 224, etc.), the provider computing system 104 may modify the one or more case datasets based on the blind access privileges and the PII access privileges of the authenticated account. For instance, as described herein, each account may or may not have blind access privileges and/or PII access privileges. Accordingly, if an account does not have blind access privileges (and the case is a blinded case (e.g., is identified as a blinded case), the provider computing system 104, prior to step 228, may modify each of the one or more case datasets to mask or hide any blinded case data (e.g., the medical product of the case, medical product registrations, substances of the medical product, etc.). In comparison, if the respective case is not a blinded case (e.g., is not identified as a blinded case) or the account has blind access privileges, the provider computing system 104 may not modify the case dataset. Likewise, if an account does not have PII access privileges, the provider computing system 104, prior to step 228, may modify each of the one or more case datasets to mask or hide any PII data (e.g., the patient's name, date of birth, address, etc.). In comparison, if the account has PII access privileges, the provider computing system 104 may not modify each case dataset. In some embodiments, to mask or hide the blinded case data and the PII case data, the provider computing system 104 may blind or mask the fields specified by the case access group preferences described herein.

It should be understood that while steps 212-228 are each described with reference to a single user computing device 108, steps 212 may take place with multiple user computing devices 108, as is typical for multi-tenant systems. For instance, steps 212-228 may be associated with and performed with two, three, four, (and so on) user computing devices 108. Each user computing device 108 may have separate authentication data (e.g., a separate username and password) and be included in or a part of one or more case access groups. In one example, two sets of authentication data may be associated with the same access group. In another example, two sets of authentication data may be associated with different access groups.

In one specific example, steps 212-228 may be performed for two, separate, user computing devices 108. For example, at step 212, the provider computing system 104 may receive first authentication data (e.g., a first username and password) from a first user computing device 108 and second authentication data (e.g., a second username and password, which is different or not the same as the first username and password) from a second user computing device 108. Then, at step 216, the provider computing system 104 may authenticate the first user computing device based on the first authentication data and the second user computing device based on the second authentication data. Further, at or after step 216, the provider computing system 104 may determine the first authentication data is for or a part of a first account which is included in a first access group, and the second authentication data is for or a part of a second account which is included in a second access group, which is different from the first access group. Then, at step 220, the provider computing system 104 may receive a first request including first case criteria from the first user computing device 108 and a second request including second case criteria from the second user computing device 108. The first case criteria and the second case criteria may be the same. At step 224, the provider computing system 104 may select two or more first case datasets based on the first case criteria, in response to the first request; and may select two or more second case datasets based on the second case criteria. In some embodiments, depending on the tier of the permissions and the case assignment data, at least one of the first case datasets may be the same as at least one of the second case datasets; and at least one of the first case datasets may be different from (i.e., is not included in) the second case datasets. In some embodiments, depending on the tier of the permissions and the case assignment data, the first case datasets may be entirely different from the second case datasets (i.e., not one first case dataset is the same as any of the second case datasets). At step 228, the provider computing system 104 may output the first case datasets to the authenticated first user computing device 108 and the second case datasets to the authenticated second suer computing device 108.

In some embodiments, after selecting the one or more case datasets from the case repository 134, the provider computing system 104 may generate a case preview or case change log electronic file. The case preview electronic file may include a listing of each of the case datasets for which the changes are occurring (e.g., each of the case datasets selected at step 220) as well as case data (e.g., case ID, WWUID, data object or field in the case being affected by the change, record ID, the outmoded medical code, the medical term, the replacement code, and/or the replacement version of the digital dictionary) (see FIG. 5C, for one example). The case preview electronic file may include be any electronic file type including, but not limited to, a Word file (.DOC/DOCX), an excel file (.XLSX), a Hypertext Markup Language file (.HTML), and/or an Extensible Markup Language file (.XML).

Referring now to FIGS. 3-5C, user interfaces shown and displayed to the user of the one or more user computing devices 108 and/or the admin of the admin computing device 112 during the method 200 are shown, according to example embodiments. As described herein, the user interfaces of FIGS. 3-5C may be one or more of web interfaces generated by the provider computing system 104 and rendered by each of the user computing devices 108 and the admin computing device 112 as part of a web application or graphical user interfaces downloaded and generated by each of the user computing devices 108 and the admin computing device 112 as part of a software application (e.g., a mobile application, etc.). Further, the user interfaces shown on FIGS. 3-5C allow for communication between the user (admin) and the provider computing system 104 via the respective user computing device 108 and the admin computing device 112 (specifically via the I/O circuit 162 and the I/O circuit 180, respectfully). Through interaction with the various user interfaces, the user (admin) may provide user input, feedback, and other data requested by the provider computing system 104. In this regard, it should be understood that each interaction described herein by the user with the user interfaces of FIGS. 3-5C may be provided to one or more of the user computing devices 108 and the admin computing device 112 and then transmitted to the provider computing system 104 and that each action described herein as occurring to the respective user computing device 108 and the admin computing device 112 (e.g., navigating to a certain page, generating a popup, etc.) may be performed by the provider computing system 104.

Figure 3:
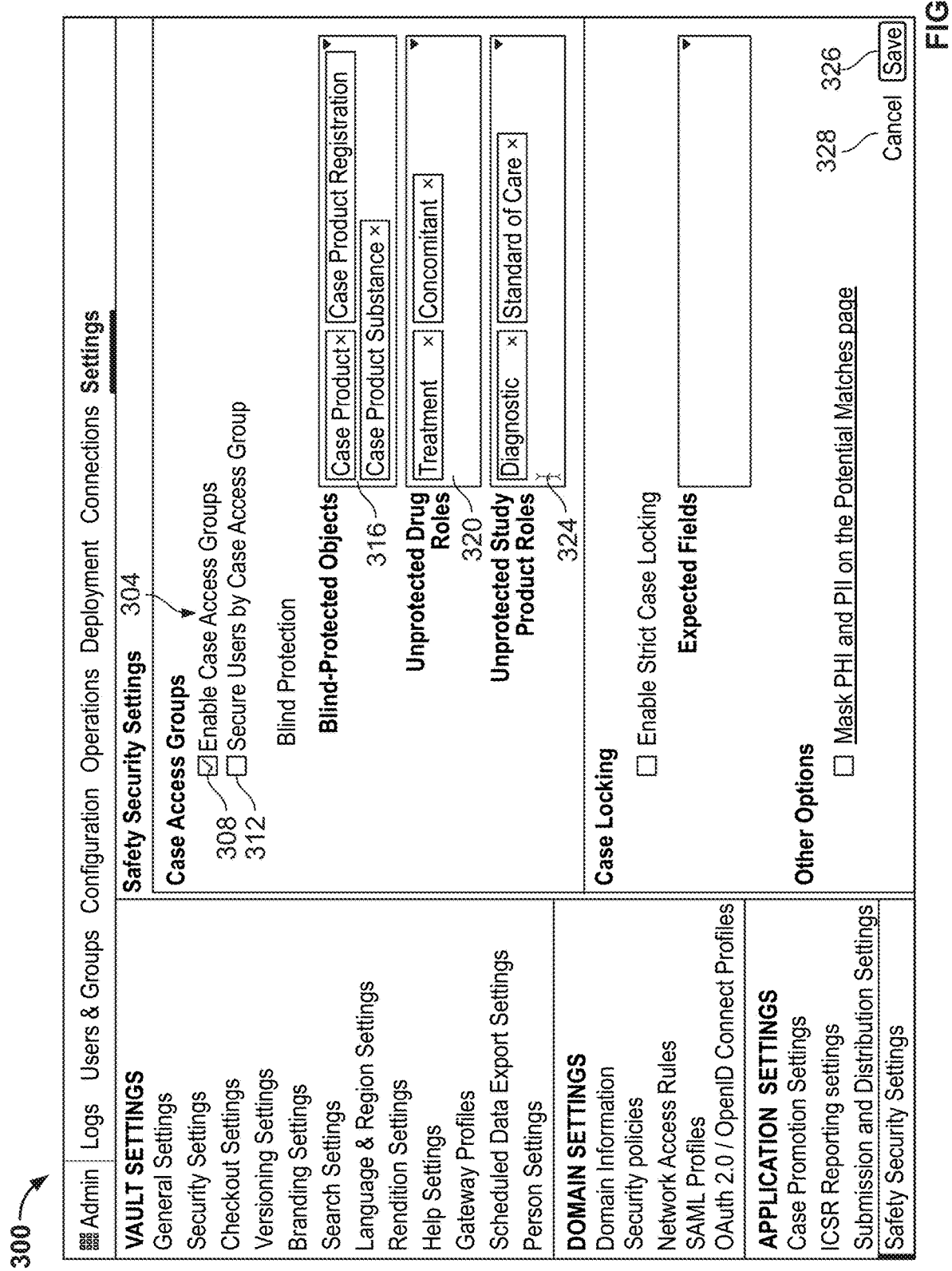
FIG. 3 may be an illustration of some aspects of a user interface generated by the case dataset intake and management system of FIG. 1 to manage case access group preferences, according to an example embodiment.

Referring now to FIG. 3, the case access group (also referred to as security) preferences page 300 which can be displayed on a display of the I/O circuit 162 and the I/O circuit 180 of the user computing device 108 and the admin computing device 112, respectfully, is shown. In general, the case access group preferences page 300 provides the user (admin) an interface to setup and manage the security and case access group preferences. As shown, the case access group preferences page 300 includes a case access group section 304, a save button 326, and a cancel button 328. To render or generate the case access group preferences page 300 on the user computing device 108 or the admin computing device 112, the provider computing system 104 may provide the case access group preferences to the user computing device 108 or the admin computing device 112. In this regard, it should be understood that each of the fields or buttons of the case access group preferences page 300 may be or include case access group preferences, as described herein.

The case access group section 304 provides the user of the respective user computing device 108 or the admin computing device 112 with an interface to set, manage, and update the case access group preferences for all case access groups. As shown, the case access group section 304 includes an enable case access group button or checkbox 308, a secure users by case access group button or checkbox 312, a blind protected objects field or list box 316, an unprotected medical product role field or list box 320, and an unprotected study product role field or list box 324. While not shown, in some embodiments, the case access group section 304 includes one or more PII preference fields or list boxes. Through interaction with the one or more PII preference fields, the user computing device 108 or the admin computing device 112 may initially set and manage the fields or pieces of case data which are masked or hidden, in response to an account not having PII access privileges. In other embodiments, the PII preferences are managed by the provider computing system 104 and based at least partially on law (e.g., HIPAA).

The enable access group checkbox 308 may be selectable and/or editable checkbox through which the user of the respective user computing device 108 or the admin computing device 112 can enable or disable case access groups (and the application of case access groups to case datasets, as described herein). For instance, by checking (or selecting for the first time) the enable access group checkbox 308, the admin computing device 112 may set access groups to enabled in the access group preferences, which, when provided to the provider computing system 104 may apply access groups to each case dataset and account (as described with reference to the method 200). The enablement or disablement of the access group may then be sent by the respective user computing device 108 to the provider computing system 104 for storage. Likewise, the secure users by case access group button or checkbox 312 may be selectable and/or editable checkbox through which the user of the respective user computing device 108 or the admin computing device 112 can enable security by access groups (e.g., preventing users of the first access group from contacting or interacting with users of the other access groups, etc.). The enable or disablement of the security by access groups may then be sent by the respective user computing device 108 to the provider computing system 104 for storage.

The blind protected objects list box 316 may be a selectable and editable list box that includes multiple options for blind-protected data objects or fields. For instance, the user of the admin computing device 112 may select the arrow of the blind protected objects list box 316, which may cause multiple options to be displayed thereon. Then, the user of the admin computing device 112 may select multiple options (e.g., "Case Product", "Case Product Registration", "Dosage", "Case Product Substance", "Case Expectedness", "Case Seriousness", "Case Product Indication", and so on) which represent data objects or fields which will be masked or hidden by the provider computing system 104, in response to an account not having blind access privileges. The selected options or fields may then be sent by the respective user computing device 108 to the provider computing system 104 for storage.

Likewise, the unprotected medical product role list box 320 and unprotected study product role list box 324 are each selectable and editable list boxes that includes multiple options for blind-unprotected fields. The unprotected medical product role list box 320 may relate to or include unprotected medical product fields; whereas the unprotected study product role list box 324 relates to or includes unprotected study fields. For instance, the user of the admin computing device 112 may select the arrow of the unprotected medical product role list box 320, which may cause multiple options to be displayed thereon. Then, the user of the admin computing device 112 may select multiple options (e.g., "Treatment", "Drug Not Administered" "Dosage", "Similar Device", "Interacting Drugs", and so on) which represent data objects or fields which will not be masked or hidden by the provider computing system 104, regardless of blind access privileges. In another example, the user of the admin computing device 112 may select the arrow of the unprotected study product role list box 324, which may cause multiple options to be displayed thereon. Then, the user of the admin computing device 112 may select multiple options (e.g., "Device", "Diagnostic" "Placebo", and so on) which represent data objects or fields which will not be masked or hidden by the provider computing system 104, regardless of blind access privileges. The selected options or fields may then be sent by the respective user computing device 108 to the provider computing system 104 for storage.

Still referring to FIG. 3, the save button 326 is a selectable buttons that, when selected, may cause the user computing device 108 or the admin computing device 112 to provide the case access group preferences of the case access group preferences page 300 (e.g., enable or disable case access groups, enable or disable secure users by case access groups, blind-protected fields or data objects, blind-unprotected fields or data objects, PII-protected fields or data objects, PII-unprotected fields or data objects, etc.) to the provider computing system 104. Likewise, the cancel button 328 is a selectable button that, when selected, may cause the user computing device 108 or the admin computing device 112 to discard or delete any changes to the data of the case access group page 300.

Figure 4:
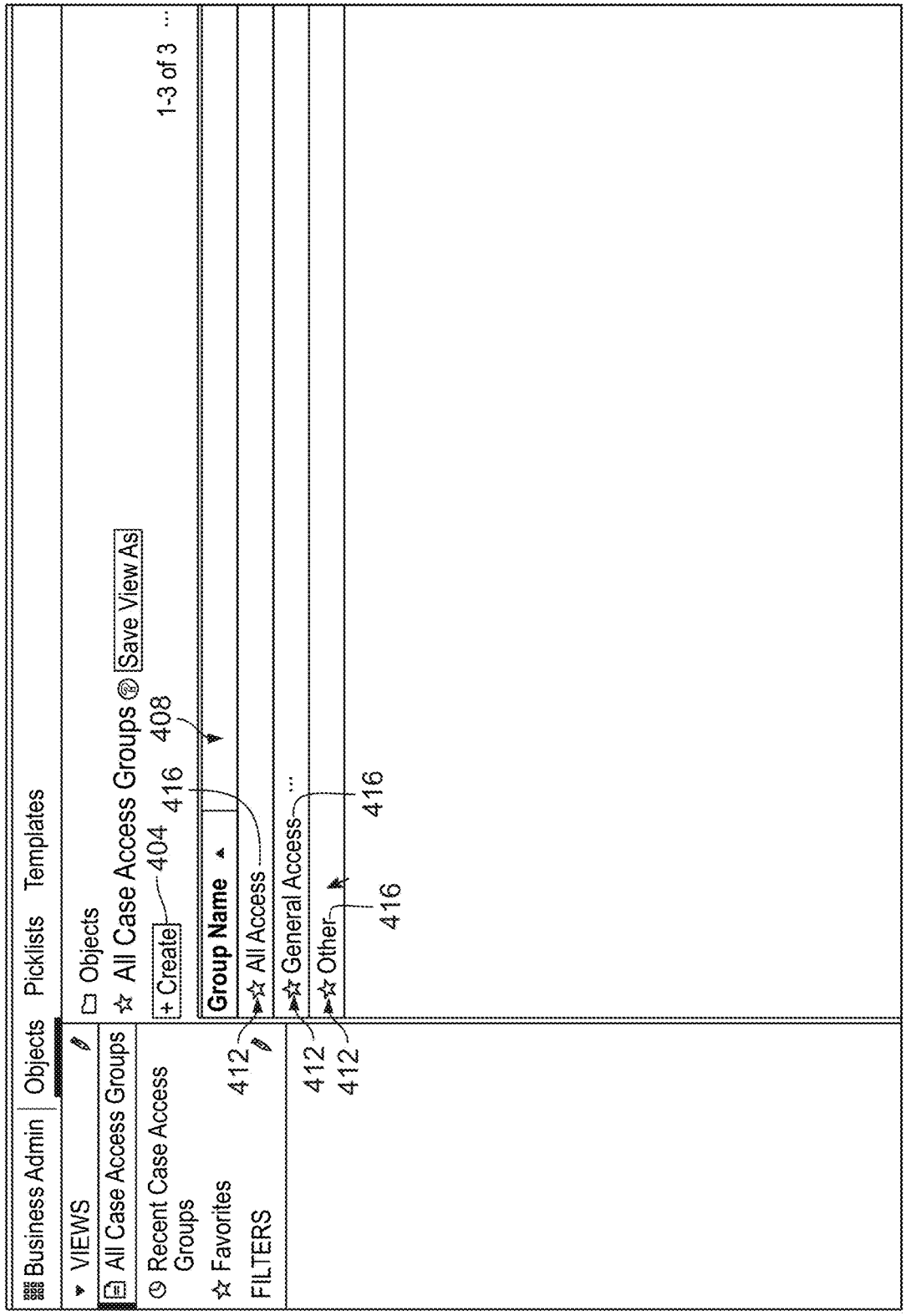
FIG. 4 may be an illustration of some aspects of a user interface generated by the case dataset intake and management system of FIG. 1 to manage one or more access groups, according to an example embodiment.

Referring now to FIG. 4, a case access group overview page 400 which can be displayed on a display of the I/O circuit 162 and the I/O circuit 180 of the user computing device 108 and the admin computing device 112, respectfully, is shown. In general, the case access group overview page 400 provides the user an interface to initially setup and manage the case access groups for a specific customer. As shown, the case access group overview page 400 includes a create or new button 404 and an existing access group section 408. To render or generate the case access group overview page 400 on the user computing device 108 or the admin computing device 112, the provider computing system 104 may provide case access group data for all case access groups of the customer (e.g., from the case access group repository (not shown)) to the user computing device 108 or the admin computing device 112.

The create button 404 is a selectable or clickable button that, when selected, may cause the user computing device 108 to generate a new case access group (or generate a request to generate a new case access group and provide the request the request to the provider computing system 104). Further, each time the create button 404 is selected, the provider computing system 104 may generate a case access group representation 412 that represents the new case access group.

The existing access group section 408 provides the user of the respective user computing device 108 or the admin computing device 112 with an interface to set, manage, and update each of the existing case access groups of the customer. As shown, the existing access group section 408 includes multiple case access group representations 412.

Each access group representation 412 may represent a case access group and include a name field 416. The name field 416 may be a selectable and/or editable text field through which the user of the respective user computing device 108 or the admin computing device 112 can edit and/or initially set the name of the case access group associated with the case access group representation 412 which may then be sent by the respective user computing device 108 to the provider computing system 104 for storage. Further, the name field 416 may be a selectable button that, when selects, causes the user computing device 108 to navigate to a case access group page 500 for the specific case access group.

Figure 5A:
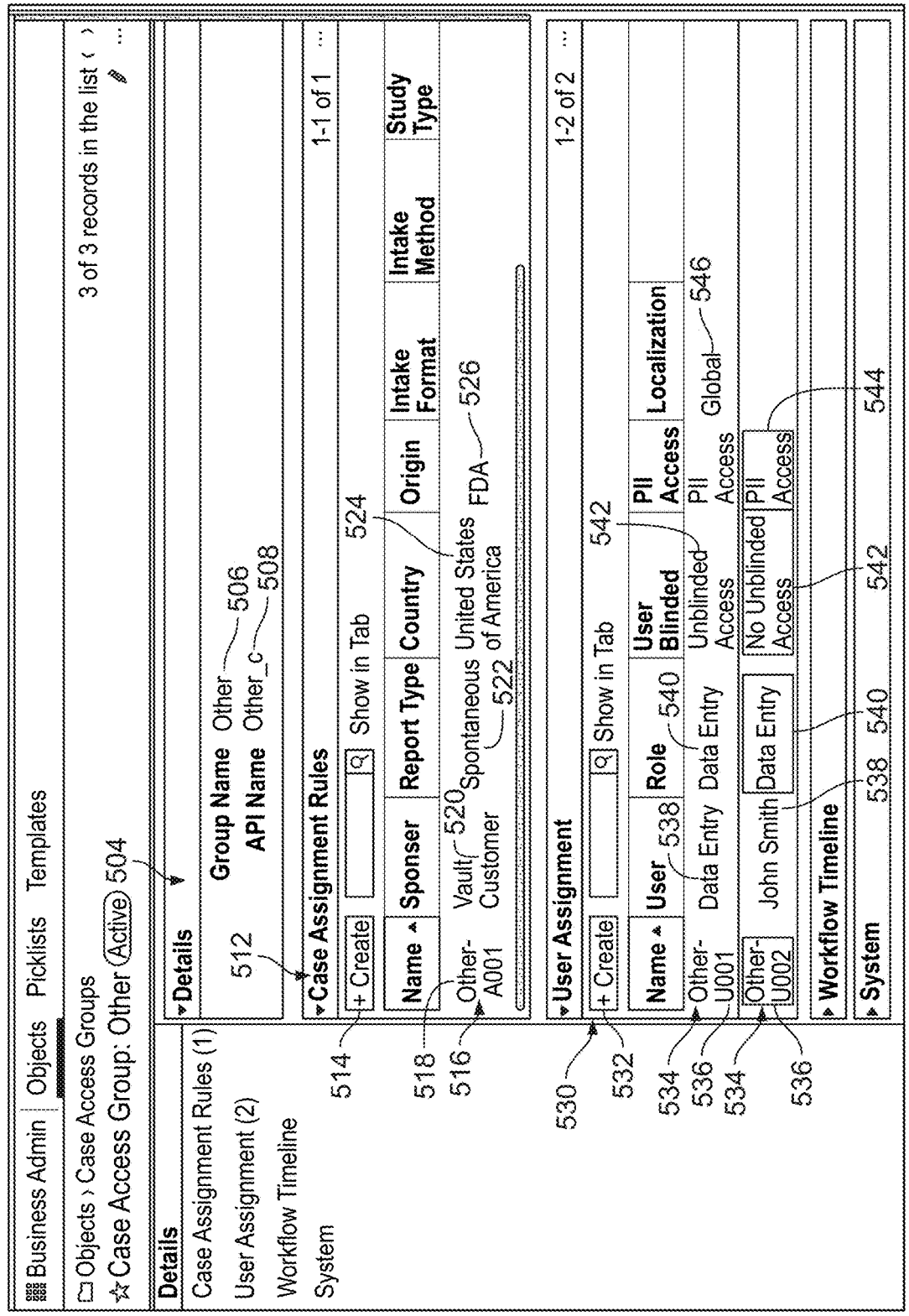
Figure 5B:
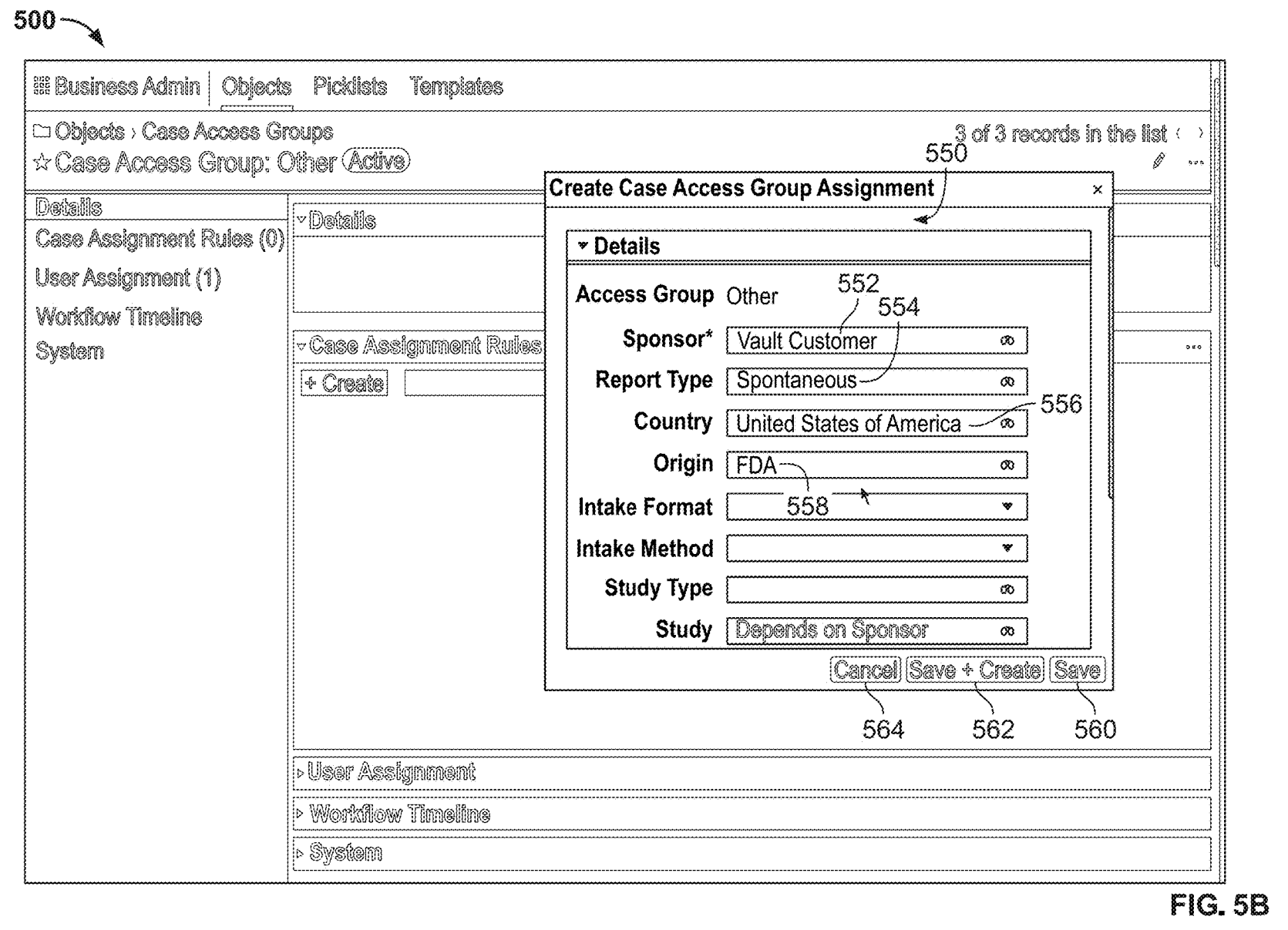
Figure 5C:
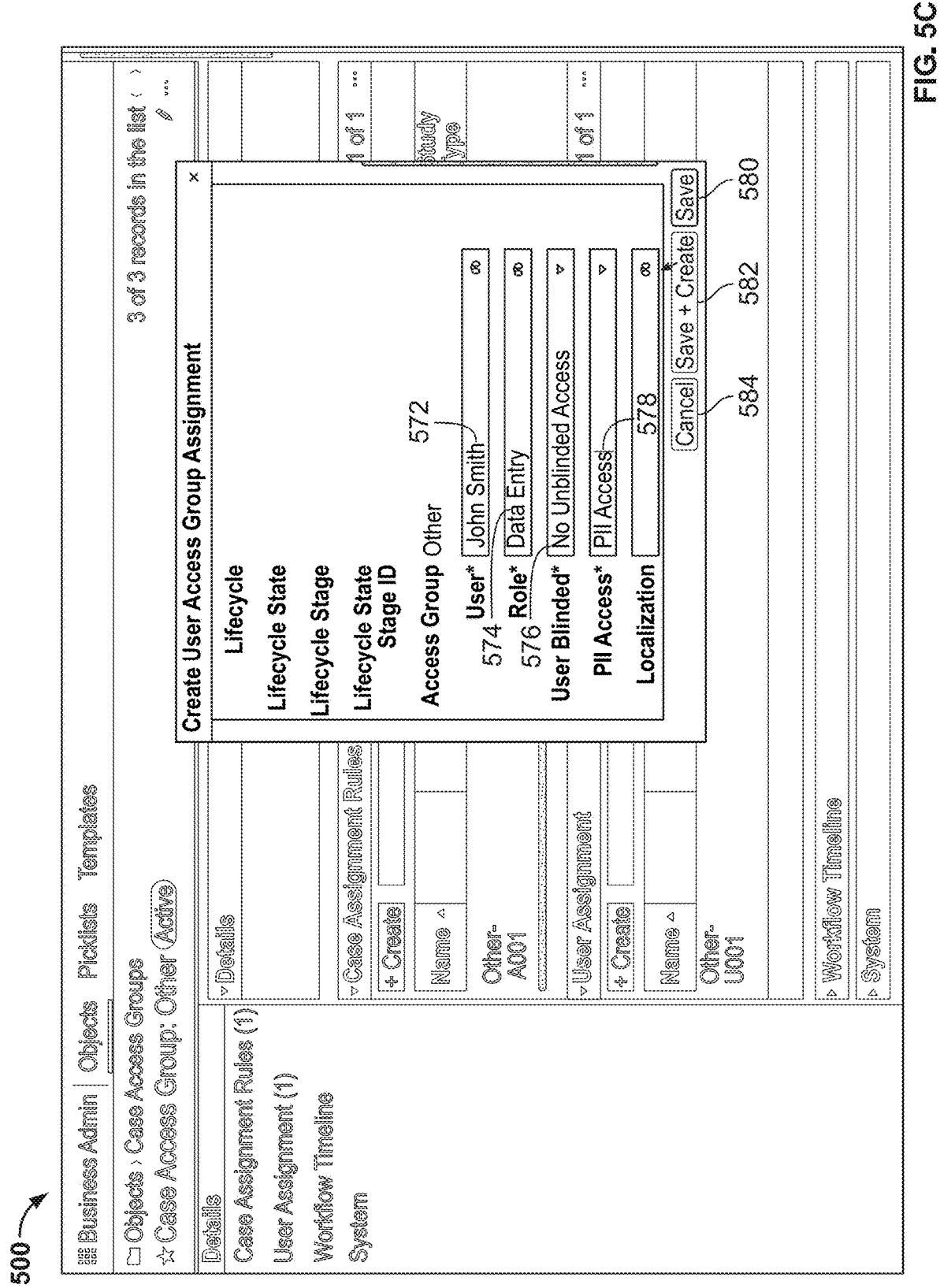

Referring now to FIGS. 5A-5C, the case access group page 500 which can be displayed on a display of the I/O circuit 162 and the I/O circuit 180 of the user computing device 108 and the admin computing device 112, respectfully, is shown. In general, the case access group page 500 provides the user an interface to setup and manage a specific case access group. As shown, the case access group page 500 includes a details or overview section 504, a case assignment section 512, and a user assignment section 530. To render or generate the case access group page 500 on the user computing device 108 or the admin computing device 112, the provider computing system 104 may provide the case access group (including the case assignment data for the case assignment section 512 and the user assignment data for the user assignment section 530) for the specific case access group of the case access group page 500 to the user computing device 108 or the admin computing device 112. In this regard, it should be understood that the access group data described herein may include or incorporate the data of the fields 506-578.

The details or overview section 504 provides the user of the respective user computing device 108 or the admin computing device 112 with details or an overview of the case access group. As shown, the details or overview section 504 includes a name field 506 and an API field 508. The name field 508 may be a selectable and/or editable text field through which the user of the respective user computing device 108 or the admin computing device 112 can edit and/or initially set the name of the case access group of the case access group page 500 which may then be sent by the respective user computing device 108 to the provider computing system 104 for storage. Likewise, the API field 508 may be a selectable and/or editable text field through which the user of the respective user computing device 108 or the admin computing device 112 can edit and/or initially set a title of the application programming interface (API) data object of the case access group of the case access group page 500 which may then be sent by the respective user computing device 108 to the provider computing system 104 for storage.

The case assignment section 512 provides the user of the respective user computing device 108 or the admin computing device 112 with an interface to manage and set the case assignment data or rules associated with the case access group of the case access group page 500. As shown, the case assignment section 512 includes a create or new button 514 and one or more case assignment rule representations 516. The create button 514 is a selectable or clickable button that, when selected, may cause the user computing device 108 to generate a new case assignment ruleset (or generate a request to generate a new case assignment ruleset and provide the request the request to the provider computing system 104). Further, each time the create button 514 is selected, the provider computing system 104 may popup or overlay a case assignment rule generation page or section 550, which will be described further herein.

Each case assignment rule representation 516 represents a specific rule or ruleset which is used to assign case datasets to the case access group (as discussed with regard to the method 200). In this regard, each case assignment rule representation 516 may include a name field 518, a sponsor or customer field 520, a report type field 522, a country field 524, an origin field 526, an intake format field (not shown), an intake method field (not shown), a study type field (not shown), and/or a study field (not shown).

The name field 518 may be a selectable and/or editable text field through which the user of the respective user computing device 108 or the admin computing device 112 can edit the name of the case assignment rule of the case assignment rule representation 516 which may then be sent by the respective user computing device 108 to the provider computing system 104 for storage. Likewise, the sponsor field 520 may be a selectable and/or editable field through which the user of the respective user computing device 108 or the admin computing device 112 can edit the customer or sponsor for which the rule of the case assignment rule representation 516 is associated, which may then be sent by the respective user computing device 108 to the provider computing system 104 for storage. The sponsor field 520 may decide which cases (e.g., which case repository 134) the rule is to be applied to.

The report type field 522 may be a selectable and/or editable field through which the user of the respective user computing device 108 or the admin computing device 112 can edit the report type (e.g., spontaneous, study, agency, product testing, etc.) of the case datasets to be included in the case access group of the case access group page 500, which may then be sent by the respective user computing device 108 to the provider computing system 104 for storage.

The country field 524 may be a selectable and/or editable field through which the user of the respective user computing device 108 or the admin computing device 112 can edit set the country or region in which the case datasets were reported or took place (e.g., USA, China, Japan, Asia, etc.) to be included in the case access group of the case access group page 500, which may then be sent by the respective user computing device 108 to the provider computing system 104 for storage. Similarly, the origin field 526 may be a selectable and/or editable field through which the user of the respective user computing device 108 or the admin computing device 112 can edit the origin (i.e., where the cases were received from (e.g., the user computing device 108, the FDA, the EMA, Worldwide, etc.) of the case datasets to be included in the case access group of the case access group page 500, which may then be sent by the respective user computing device 108 to the provider computing system 104 for storage.

The user assignment section 530 provides the user of the respective user computing device 108 or the admin computing device 112 with an interface to manage and set the user assignment data or rules associated with the case access group of the case access group page 500. As shown, the user assignment section 530 includes a create or new button 532 and one or more user assignment rule representations 534. The create button 532 is a selectable or clickable button that, when selected, may cause the user computing device 108 to generate a new user assignment ruleset (or generate a request to generate a new user assignment ruleset and provide the request the request to the provider computing system 104). Further, each time the create button 532 is selected, the provider computing system 104 may popup or overlay the user assignment generation page or section 570, which will be described further herein.

Each user assignment rule representation 534 represents a specific rule or ruleset which is used to assign users (or accounts) to the case access group (as discussed with regard to the method 200). In this regard, each user assignment rule representation 534 may include a name field 536, a user or user(s) field 538, a role field 540, a blind access privilege field 542, a PII access privilege field 544, and a localization field 546.

The name field 536 may be a selectable and/or editable text field through which the user of the respective user computing device 108 or the admin computing device 112 can edit the name of the user assignment rule of the user assignment rule representation 534 which may then be sent by the respective user computing device 108 to the provider computing system 104 for storage. Likewise, the user field 538 may be a selectable and/or editable field through which the user of the respective user computing device 108 or the admin computing device 112 can edit the user or user(s) of the user assignment rule representation 534 which may then be sent by the respective user computing device 108 to the provider computing system 104 for storage. For instance, via the user field 538, the admin may select a specific user or account (e.g., John Smith) or a generic set of users or accounts (e.g., "Data Entry") which may then be defined further via the role field 540.

In this regard, the role field 540 may be a selectable and/or editable field through which the user of the respective user computing device 108 or the admin computing device 112 can edit the roles or roles of the users of the of the user assignment rule representation 534 is associated which may then be sent by the respective user computing device 108 to the provider computing system 104 for storage. The role may indicate a job title or position and identify a group of users or accounts that share specific characteristics. For instance, the role "Data Entry" may be associated with accounts that are used for the entry of data into the provider computing system 104.

The blind access privilege field 542 may be a selectable and/or editable field through which the user of the respective user computing device 108 or the admin computing device 112 can edit the blind access privileges of the user assignment rule which may then be sent by the respective user computing device 108 to the provider computing system 104 for storage. For instance, via the blind access privilege field 542, the admin may set the blind access privilege of a specific user to "Unblinded Access" or "No Unblinded Access", which may be used by the provider computing system 104 to modify blinded fields of the case dataset for the specific user or account.

Likewise, the PII access privilege field 544 may be a selectable and/or editable field through which the user of the respective user computing device 108 or the admin computing device 112 can edit the PII access privileges of the user assignment rule which may then be sent by the respective user computing device 108 to the provider computing system 104 for storage. For instance, via the PII access privilege field 544, the admin may set the PII access privilege of a group of users (e.g., data entry employees) to "PII Access" or "No PII Access", which may be used by the provider computing system 104 to modify PII fields of the case dataset for the specific users or accounts.

The localization field 546 may be a selectable and/or editable field through which the user of the respective user computing device 108 or the admin computing device 112 can edit the localization of the user assignment rule representation 534 which may then be sent by the respective user computing device 108 to the provider computing system 104 for storage. For instance, via the localization field 546, the admin may select a specific localization or region of the users that are to be included in the case access group (e.g., Europe, Asia, USA, Japan). In one example, the user assignment rule representation 534 may include the user field 538 with "Data Entry", the Role field 540 with "Data Entry", and the localization field 546 with "Europe". Accordingly, during the method 200, based on the user assignment data of the case access group data, the provider computing system 104 may select all users or accounts with the title "Data Entry" that are located in the region "Europe".

Referring now to FIG. 5B, the case access group page 500 is shown to include the case assignment rule generation page or section 550. When the user would like to generate a new case assignment rule representation 516, the user may select the create button 514. In response, the user computing device 108 or the admin computing device 112 may popup and display the case assignment rule generation section 550 (e.g., displayed in front of the rest of the case access group page 500, as shown). The case assignment rule generation section 550 provides an interface to initially set each of the fields of the new case assignment rule representation 516. As shown the case assignment rule generation section 550 includes a sponsor dropdown box 552, a report type drop down box 554, a country drop down box 556, an origin drop down box 558, an intake format drop down box (not shown), an intake method drop down box (not shown), a study type drop down box (not shown), a study drop down box (not shown), a save button 560, a save and create new button 562, and a cancel button 564.

Referring now to FIG. 5C, the case access group page 500 is shown to include the case user rule generation page or section 570. When the user would like to generate a new user assignment rule representation 534, the user may select the create button 532. In response, the user computing device 108 or the admin computing device 112 may popup and display the user rule generation section 570 (e.g., displayed in front of the rest of the case access group page 500, as shown). The user rule generation page or section 570 provides an interface to initially set each of the fields of the new user assignment rule representation 534. As shown the user rule generation page or section 570 includes a user drop down box 572, a role drop down box 574, a blind access privilege drop down box 576, a PII access privilege drop down box 578, a localization drop down box (not shown), a save button 580, a save and create new button 582, and a cancel button 584.

The embodiments described herein have been described with reference to the drawings. The drawings illustrate certain details of specific embodiments that implement the systems, methods, and programs described herein. However, describing the embodiments with drawings should not be construed as imposing on the disclosure any limitations that may be present in the drawings.

It should be understood that no claim element herein is to be construed under the provision of 35 U.S.C § 112 (f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexors, registers, capacitors, inductors, diodes, wiring, and so on.

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other embodiments, two or more processors may be coupled via a bus to enable independent, parallel, pipelined, or multi-threaded instruction execution. Each processor may be implemented as one or more general purpose processors, application specific integrated circuits (ASICs), field programmable gate arrays (FPGAs), digital signal processors (DSPs), or other suitable electronic data processing components structured to execute instructions provided by the memory. The one or more processors may take the form of a single core processor, a multi-core processor (e.g., dual core, quad core, etc.), microprocessor, etc. In some embodiments, the one or more processors may be external to the apparatus. For example, the one or more processors may be a remote processor (e.g., a cloud-based processor). Alternatively or additionally, the one or more processors may be internal and/or local to the apparatus. In this regard, a circuit or components thereof may be disposed locally (e.g., as part of a local server, a local computing system) or remotely (e.g., as part of a remote server such as a cloud-based server). To that end, a "circuit" as described herein may include components that are distributed across one or more locations. Further, each of the circuits described herein may be distributed across one or more locations (e.g., each as part of one or more remote servers).

An example system for implementing the overall system or portions of the embodiments might include a general purpose computing device in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile storage media may take the form of ROM, flash memory (e.g., flash memory such as NAND, 3D NAND, NOR, 3D NOR), EEPROM, MRAM, magnetic storage, hard disks, optical disks, etc. Combinations of the above are also included within the scope of machine-readable media. In this regard, machine-executable instructions comprise, for example, instructions and data which cause a general purpose computer, special purpose computer, or special purpose processing machine to perform a certain function or group of functions. Each respective memory device may be operable to maintain or otherwise store data relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, a joystick, or other input devices performing a similar function. Comparatively, the term "output device," as described herein, may include any type of output device including, but not limited to, a computer monitor, printer, facsimile machine, or other output devices performing a similar function.

It should be noted that the term "field," as described herein may include any form of an input field through which the user interfaces shown and described may receive input from a user of a computing device. For instance, the term "field" may include a text field, a drop-down box and selectable options, a list box, a lookup box, a search bar, an icon, one or more checkboxes, one or more radio buttons, a button, a toggle, a date field, a slider, and the like. Further, each "field" may include and/or receive data that may be associated with a data object as described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes, and omissions may be made in the design, operating conditions and embodiment of the embodiments without departing from the scope of the present disclosure as expressed in the appended claim.

What is claimed is:

1. A method for accessing case datasets in a case dataset intake and management system, wherein the case dataset intake and management system comprises a provider computing comprising a case repository for storing case datasets and an account repository for storing user accounts, the method comprising:
   receiving, by a network interface of the provider computing system, access group data associated with an access group and including case assignment data and user assignment data;
   assigning, by a processing circuit of the provider computing system, a plurality of case datasets of the case repository to the access group based on the case assignment data;
   assigning, by the processing circuit, one or more user accounts of the account repository to the access group based on the user assignment data;
   receiving, by the network interface, user computing device authentication data;
   authenticating, by the processing circuit, the user computing device authentication data;
   receiving, by the network interface, a request for at least one case dataset, wherein the request for the at least one case dataset includes case criteria;
   selecting, by the processing circuit, one or more case datasets of the plurality of case datasets assigned to the access group from the case repository based on the case criteria; and
   outputting, by the network interface, the selected one or more case datasets in response to the request and based on the user computer device authentication data.

2. The method of claim 1, wherein the account repository includes account data associated with each user account, wherein the account data includes trusted authentication data, and wherein authenticating the user computing device authentication data comprises:
   searching, by the processing circuit, the account repository for trusted authentication data matching the received user computing device authentication data; and
   determining, by the processing circuit, the user computing device authentication data is authenticated based on the account repository including trusted authentication data matching the received user computing device authentication data.

3. The method of claim 1, wherein the user computing device authentication data is received from an electronic address, and wherein authenticating the user computing device authentication data comprises:
   generating, by the processing circuit, a limited-use key (LUK); and
   assigning, by the processing circuit, the LUK to the electronic address,
   wherein the request for the at least one case dataset further includes the LUK.

4. The method of claim 1, wherein the user computing device authentication data includes at least one of a username, a password, or a two-factor authentication code.

5. The method of claim 1, further comprising:
   determining, by the processing circuit, the user computing device authentication data is associated with a user account assigned to the access group,
   wherein selecting the one or more case datasets of the plurality of case datasets assigned to the access group from the case repository is in response to determining the user computing device authentication data is associated with the user account assigned to the access group.

6. The method of claim 1, wherein the case criteria include at least one of a medical product identifier, an adverse event code, or a region of origin.

7. The method of claim 1, wherein each case dataset of the plurality of case datasets includes a case dataset data object, wherein assigning the plurality of case datasets to the case access group comprises:
   selecting, by the processing circuit, the plurality of case datasets from the case repository based on the case assignment data;
   adding, by the processing circuit, a link to the access group data in the case dataset data object of each case dataset of the plurality of case datasets; and
   storing, by the processing circuit, the updated plurality of case datasets in the case repository.

8. The method of claim 1, wherein the access group data includes personally-identifying information (PII) access privilege data, and wherein the method further comprises:
   modifying, by the processing circuit, each of the selected one or more case datasets based on the PII access privilege data.

9. The method of claim 1, wherein the access group data includes blind access privilege data, and wherein the method further comprises:
   modifying, by the processing circuit, at least one of the selected one or more case datasets based on the blind access privilege data.

10. The method of claim 1, wherein the access group data includes blind access privilege data and further comprising:

receiving, by the network interface, a case access group preference, wherein the case access group preference identifies a case dataset field to mask for blinded case datasets; and modifying, by the processing circuit, at least one of the selected one or more case datasets to mask the case dataset field identified in the case access group preference.

11. A method for accessing case datasets in a case dataset intake and management system, wherein the case dataset intake and management system comprises a provider computing system comprising a case repository for storing case datasets and an account repository for storing user accounts, the method comprising:

receiving, by a network interface of the provider computing system, first access group data associated with a first access group and including first case assignment data and first user assignment data;

receiving, by the network interface, second access group data associated with a second access group and including second case assignment data and second user assignment data;

assigning, by a processing circuit of the provider computing system, a first plurality of case datasets of the case repository to the first access group based on the first case assignment data;

assigning, by the processing circuit, one or more first user accounts of the account repository to the first access group based on the first user assignment data;

assigning, by a processing circuit of the provider computing system, a second plurality of case datasets of the case repository to the second access group based on the second case assignment data;

assigning, by the processing circuit, one or more second user accounts of the account repository to the second access group based on the second user assignment data;

receiving, by the network interface, first user computing device authentication data;

authenticating, by the processing circuit, the first user computing device authentication data;

receiving, by the network interface, second user computing device authentication data;

authenticating, by the processing circuit, the second user computing device authentication data;

receiving, by the network interface, a first request for at least one case dataset, wherein the first request for the at least one case dataset includes case criteria;

selecting, by the processing circuit, one or more case datasets of the first plurality of case datasets assigned to the first access group from the case repository based on the case criteria;

receiving, by the network interface, a second request for at least one case dataset, wherein the second request for the at least one case dataset includes the case criteria; and selecting, by the processing circuit, one or more case datasets of the second plurality of case datasets assigned to the second access group from the case repository based on the case criteria, wherein the first plurality of case datasets and the second plurality of case datasets include no matching case datasets.

12. The method of claim 11, wherein the account repository includes account data associated with each user account, wherein the account data includes trusted authentication data, and wherein authenticating the first user computing device authentication data comprises:

searching, by the processing circuit, the account repository for trusted authentication data matching the received first user computing device authentication data; and determining, by the processing circuit, the first user computing device authentication data is authenticated based on the account repository including trusted authentication data matching the received first user computing device authentication data.

13. The method of claim 11, wherein the user computing device authentication data is received from an electronic address, and wherein authenticating the first user computing device authentication data comprises:

generating, by the processing circuit, a limited-use key (LUK); and assigning, by the processing circuit, the LUK to the electronic address, wherein the first request for the at least one case dataset further includes the LUK.

14. The method of claim 11, wherein the first user computing device authentication data includes at least one of a username, a password, or a two-factor authentication code.

15. The method of claim 11, further comprising:

determining, by the processing circuit, the first user computing device authentication data is associated with a user account assigned to the first access group, wherein selecting the one or more case datasets of the first plurality of case datasets assigned to the first access group from the case repository is in response to determining the first user computing device authentication data is associated with the user account assigned to the first access group.

16. The method of claim 11, wherein the case criteria include at least one of a medical product identifier, an adverse event code, or a region of origin.

17. The method of claim 11, wherein each case dataset of the first plurality of case datasets includes a case dataset data object, wherein assigning the first plurality of case datasets to the first case access group comprises:

selecting, by the processing circuit, the plurality of first case datasets from the case repository based on the first case assignment data;

adding, by the processing circuit, a link to the first case access group data to the case dataset data object of each case dataset of the first plurality of case datasets; and storing, by the processing circuit, the updated first plurality of case datasets in the case repository.

18. The method of claim 11, wherein the first access group data includes personally-identifying information (PII) access privilege data, and wherein the method further comprises:

modifying, by the processing circuit, each of the selected one or more case datasets of the first plurality of case datasets based on the PII access privilege data.

19. The method of claim 11, wherein the first access group data includes blind access privilege data, and wherein the method further comprises:

modifying, by the processing circuit, at least one of the selected one or more case datasets of the first plurality of case datasets based on the blind access privilege data.

20. The method of claim 11, wherein the first access group data includes blind access privilege data and further comprising:

receiving, by the network interface, a case access group preference, wherein the case access group preference identifies a case dataset field to mask for blinded case datasets; and modifying, by the processing circuit, at least one of the selected one or more case datasets of the first plurality of case datasets to mask the case dataset field identified in the case access group preference.

\* \* \* \* \*